Oct. 17, 1967 S. E. KAPPE 3,347,784
SEWAGE TREATMENT PROCESS AND APPARATUS
Filed May 5, 1965

Inventor
Stanley E. Kappe
By
Dressler, Goldsmith, Clement, Gordon & Ladd
Attorneys United States Patent Office 3,347,784
Patented Oct. 17, 1967

3,347,784
SEWAGE TREATMENT PROCESS AND
APPARATUS
Stanley E. Kappe, Bethesda, Md., assignor to FMC
Corporation, a corporation of Delaware
Filed May 5, 1965, Ser. No. 453,353
17 Claims. (Cl. 210—6)

This invention relates to the treatment of sewage waste. More particularly, it relates to an aerobic system for the treatment of sewage. Still more particularly, it relates to a compact system for aerobic treatment of sewage particularly adaptable to marine usage and to apparatus for carrying out the process.

Briefly, the apparatus of the present invention comprises a compartmentalized tank, closed at the bottom, sides and top, adapted for introduction of aqueous waste into the first compartment of said tank and for discharge of treated effluent from the final compartment of said tank, the first compartment being provided with means for introducing air to produce an aeration zone for aqueous wastes, the final compartment being a holding zone for effluent produced by the separation of treated mixed liquor and an intermediate compartment, said intermediate compartment itself being divided into two subcompartments, the first subcompartment being adapted for quiescent flow and settling of solids from the treated mixed liquor received through a submerged communication link with the first compartment, the second subcompartment communicating with the first subcompartment through a port adjacent the bottom of the wall separating said contiguous subcompartments and being provided with means for introducing air into the concentrated sludge and adapted with means for moving areated sludge from said second subcompartment to said first compartment for formation of a mixed liquor therein.

This apparatus is a closed unitary system. The process carried out in this apparatus, involves steps wherein aqueous waste is mixed with aerated, concentrated sludge to form a mixed liquor in an accumulation-aeration zone. Air is introduced into the mixed liquor in this accumulation-aeration zone in quantities to effect a substantial reduction in biological oxygen demand (BOD). Transfer of aerated mixed liquor from said accumulation-aeration zone to a contiguous settling zone is through a submerged port in the partition separating said zones. Withdrawal of clarified effluent from said settling zone is made to an effluent storage zone which may or may not be adapted for chemical disinfection. Withdrawal of effluent from the settling zone causes a flow of mixed liquor to the settling zone in a liquid level maintaining response to the withdrawal. Transfer of settled sludge to a re-aeration zone from said settling zone is likewise through a submerged port in a partition separating said re-aeration and settling zones and occurs as a consequence of liquid level maintaining response to discharge of sludge from said re-aeration zone.

Plants for the treatment of aqueous wastes of a size for the treatment of sewage from individual installations where the number of people involved is limited, for example, 50 to 500 people, have not been looked upon with favor because the scaled-down versions of regular treatment plants have been exorbitantly expensive per unit of capacity to build, to maintain, and to operate. Such plants have not been reduced in functional components, in the need for trained operators, in the relatively high power cost, and the like. Adaption of small plants to marine uses, which impose a public health requirement for high BOD removal, has been further complicated by the fact that ship motion tends to interfere with one of the primary and necessary operations, namely, sludge settling.

Now it has been discovered that aqueous wastes whose periodic flow rates may be high, but whose total daily flow may be relatively low, can be processed in a simplified operation giving highly efficient aerobic treatment, i.e., high BOD removal, by combining in a completely closed system, a single tank closed at the bottom, sides and top and divided by partitions into an aeration compartment, a settling compartment, a sludge re-aeration compartment and a treated liquid or effluent storage compartment, said settling compartment being contiguous to said aeration compartment and said re-aeration compartment being contiguous to said settling compartment, the partition between said aeration compartment and settling compartment having an aperature or port below the normal liquid level maintained in said compartments, the partition between said settling compartment and said re-aeration compartment having a slot therein adjacent the bottom of said tank, means through which sewage is introduced into said aeration compartment, means for introducing air into the contents of said re-aeration compartment, means for moving predetermined quantities of re-aeration tank contents to said aeration compartment, means for moving predetermined quantities of effluent from settling compartment to said storage compartment, a baffle adjacent the outlet of said means for moving effluent into the storage compartment forming a mixing area, means for introducing disinfectant into said mixing area in said effluent storage compartment, means for venting each of said compartments and means for discharging the liquid content of the effluent storage compartment overboard. This type of treatment tank, which handles raw waste with or without primary settling, operates with all compartments except the aeration compartment flooded to the design capacity.

The process for treating sewage in accordance with this invention comprises a closed system adapted to receive raw sewage and to discharge treated effluent. The processing steps involve establishing a mixture of liquid and sludge in an accumulation zone for sewage having a volume somewhat greater than the volume of the subsequent processing steps, which are sized for average daily flow, in order to compensate for surges in raw sewage flow exceeding the capacity of the average rated effluent discharge volume. The sewage is generally introduced into the accumulation-aeration zone in a suspendable particle size form to produce a mixed liquor with the liquid sewage and sludge therein, passing air into the contents of said zone, i.e., the mixed liquor, in quantities to effect a substantial BOD removal. Aerated mixed liquor is usually continuously flowed from the aeration zone to a contiguous settling zone through a submerged port. Clarified effluent is periodically or continuously displaced to an effluent storage zone. Concentrated sludge is periodically or continuously moved from a sludge re-aeration zone contiguous to said settling zone which has submerged intercommunication therebetween to maintain the same liquid level in each zone, and recycled to said aeration zone. Movement of sludge simultaneously effects transfer of settled sludge during said displacement operation through said submerged communication port positioned adjacent the bottom of said settling zone, from said settling zone to said sludge re-aeration zone. A venting system for each of said zones communicates with a common exhaust to the atmosphere.

More in detail, in one mode of operation, the process of treating sewage as applied to marine usage comprises introducing sewage into an accumulation zone which is also an aeration zone in which a typical BOD reduction to be effected will be from about 400 mg. per liter to between 100 and about 20 mg. per liter, i.e., BOD removals in the range between about 75% and 95%.

Sewage in suspendable form is generally introduced into the aeration zone in metered amounts and aeration effected on a continuous or intermittent basis during the period of accumuulation of a major portion of the sewage or on a continuous basis regardless of the quantity of incoming raw sewage. An oxygen-bearing gaseous medium, usually air is introduced into the body of mixed liquor to effect aeration in quantities to produce, preferably substantially complete reduction in biological oxygen demand. This oxygen-bearing gaseous medium may also be utilized for gaseous medium being introduced into the re-aeration zone.

Sewage flow aboard marine vessels is generally subject to considerable fluctuation. During the period of high rate of flow of raw aqueous waste, the volume of mixed liquor in the aeration tank increases because the effluent discharge from the settling compartment is generally at a fixed rate. The aeration tank is therefore adapted with an excess of capacity so as to provide a fluctuating excess storage capacity, to store flows in excess of rated capacity of the system, and to dampen flows through the system so that over a 24 hour period, flow will be at the design rate and not unduly disturbed by the periodic surges and to maintain the settling and re-aeration zones operating under pressure and at full volume capacity. To accommodate peak rates of flow the volumes of the tank compartments other than the aeration compartment are designed for an average rate of flow and the aeration compartment generally is designed for up to about 100% excess capacity, preferably 10% to 50% excess capacity. This excess capacity provides a way for dampening the flow to avoid surges when the treating capacity is small. However, if desired, controls may be installed so that with an increase in the volume of the contents of the aeration compartment, an increase in effluent discharge will be automatically induced.

The amount of sulge being recycled from the re-aeration compartment to the aeration compartment will generally vary from about 25% to 200% by volume based upon the incoming flow into the aeration compartment. This recycle is accomplished by displacing re-aerated sludge by such means as a siphon, an air lift, a positive displacement pump, and the like.

The re-aeration compartment and the settling compartment communicate through submerged means adjacent the bottom of the two tanks, which unobstructed submerged means permits flow of liquid to keep the zones at the same liquid level which, for optimum conditions, should be a flooded condition with the pressure created by a liquid head of generally an average of 4 to 5 inches of liquid in the aeration tank, although at times the aeration tank itself may be a flooded compartment. As a consequence, when sludge is recycled and level in the re-aeration liquid compartment drops, flow is induced which moves sludge concentrated in the bottom of the settling compartment into the re-aeration compartment.

Communication between the aeration compartment and the settling compartment is also through submerged means for moving liquid. Such submerged means usually is in the form of a port or baffled port or screened port, and the like, which means prevent the transfer of any appreciable quantity of gas bubbles from the aeration compartment to the settling compartment. Preferably, the baffling means is of a type to cause mixed liquor to flow downwardly in order to enter the settling zone thus maximizing separation of liquid from air which will thus remain in the aeration tank and not come through into the settling zone to disturb the settling operation. Prevention of passage of air may be accomplished by suitable means positioned on the aeration zone side of the transfer port or the settling zone side. A simple means positionable on the settling zone side is a vertical T with one leg extending downwardly into the settling zone and the other leg extending upwardly to the vented area above the settling zone. As a consequence of the submerged communication, when the volume of mixed liquor in the aeration compartment tends to rise, flow of mixed liquor to the settling compartment is automatic. Flow is also automatically induced when effluent is being discharged from the settling compartment. This effluent discharge, generally, is at a continuous and metered rate so that there is a continuous transfer of treated mixed liquor to the settling compartment but such transfer may also be induced on an intermitten basis. In the settling compartment, a cencentrated sludge and a clarified effluent is produced. The effluent is moved by suitable means such as an air lift, rotary pump, positive displacement pump, and the like from the settling compartment to an effluent storage zone or compartment. Effluent being moved to the storage compartment may or may not contain coliform organisms. In order to disinfect such effluent, the effluent is treated in a mixing or turbulent portion of said storage zone segregated by suitable baffle means, with a disinfecting agent such as an agent capable of freeing chlorine, for example, sodium hypochlorite, sodium hypochlorate, and the like. A chlorinated effluent or other chemically treated effluent will be safe for discharge to the local waters even when a marine vessel is docked in port.

The invention will be further understood from the following detailed description taken in conjunction with the accompanying drawings in which.

Figure 1:
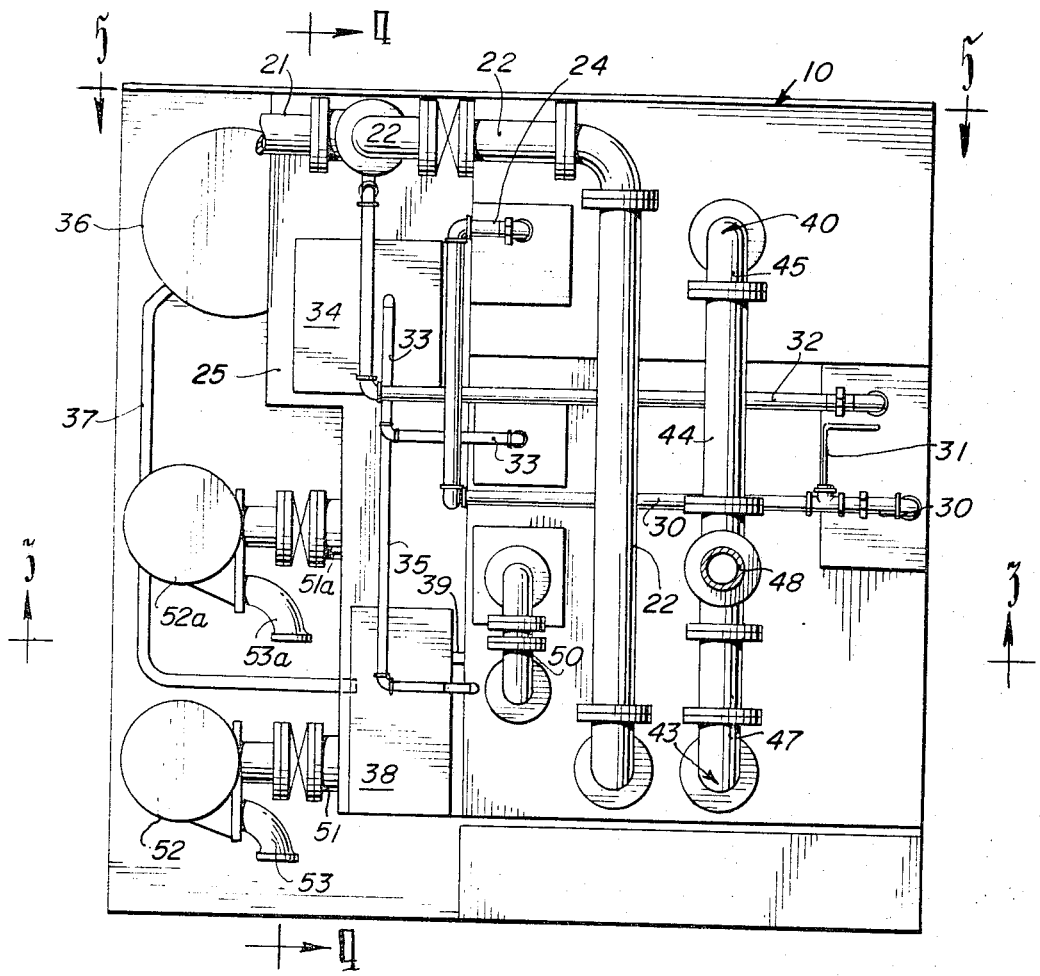
FIGURE 1 is a top plan view of a tank for processing sewage in accordance with the instant invention.
Figure 2:
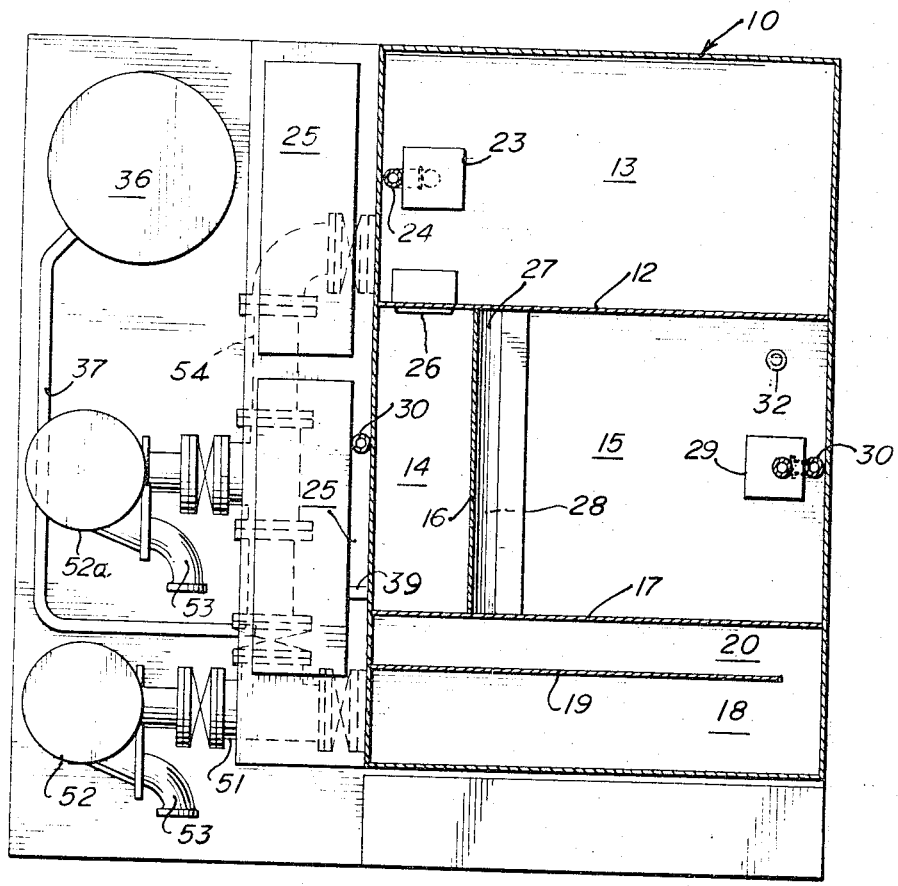
FIGURE 2 is a horizontal cross-sectional view of the tank along the line 2—2 of FIGURE 4.
Figure 3:
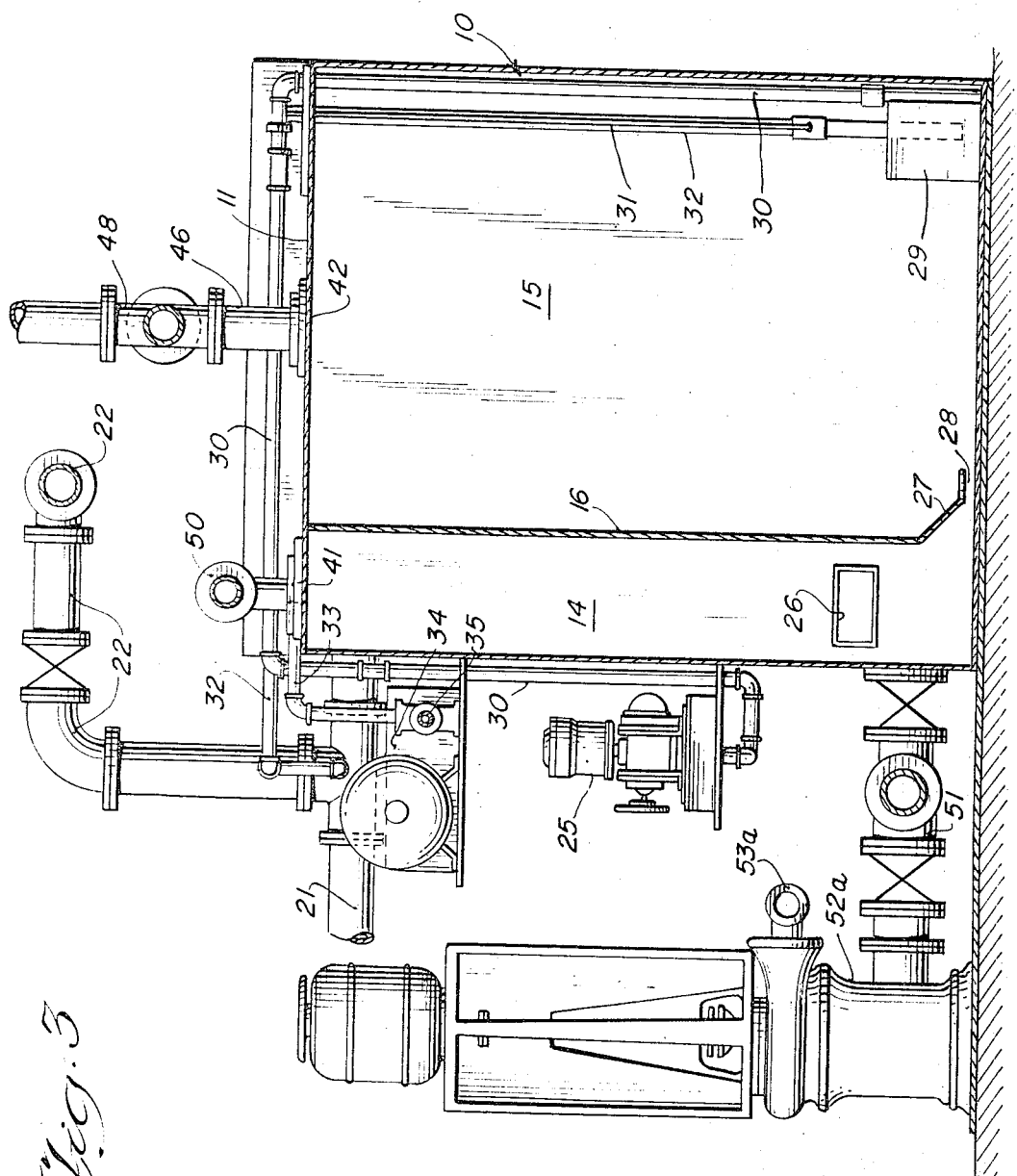
FIGURE 3 is a side elevational view along the line 3—3 of FIGURE 1.
Figure 4:
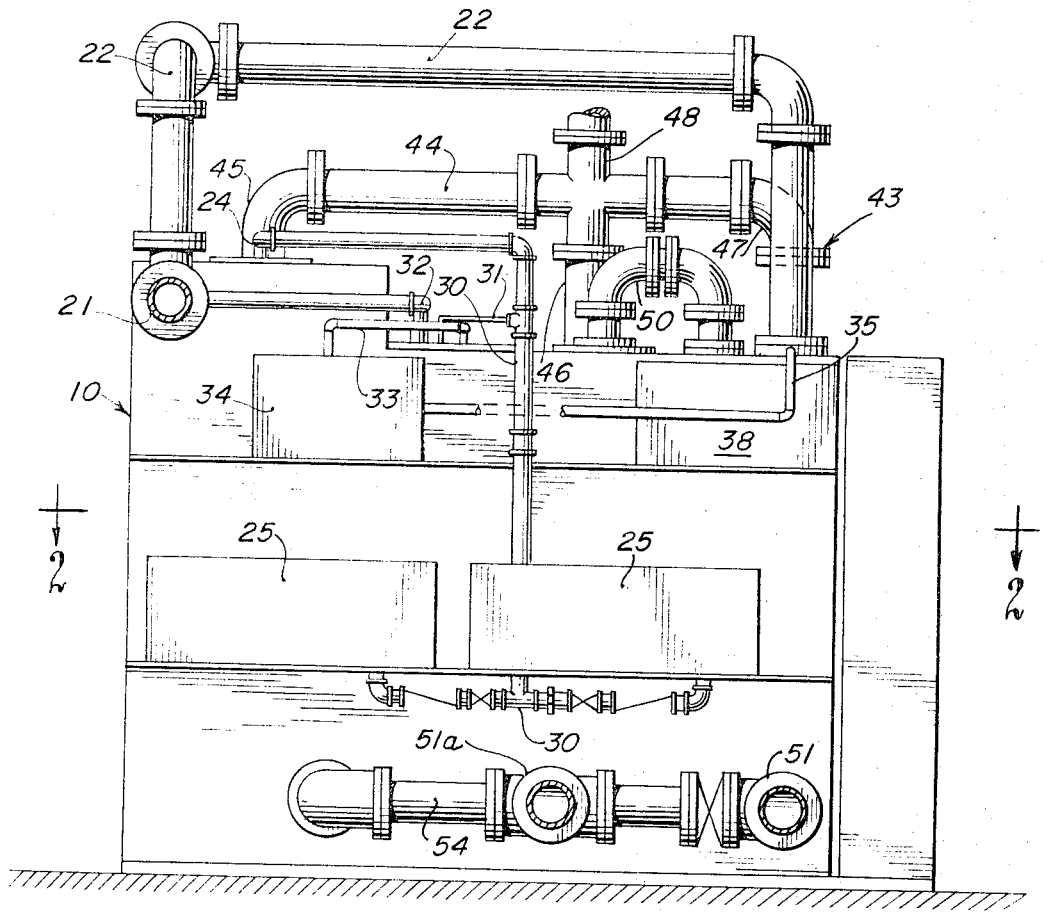
FIGURE 4 is a schematic side elevational view along the line 4—4 of FIGURE 1.
Figure 5:
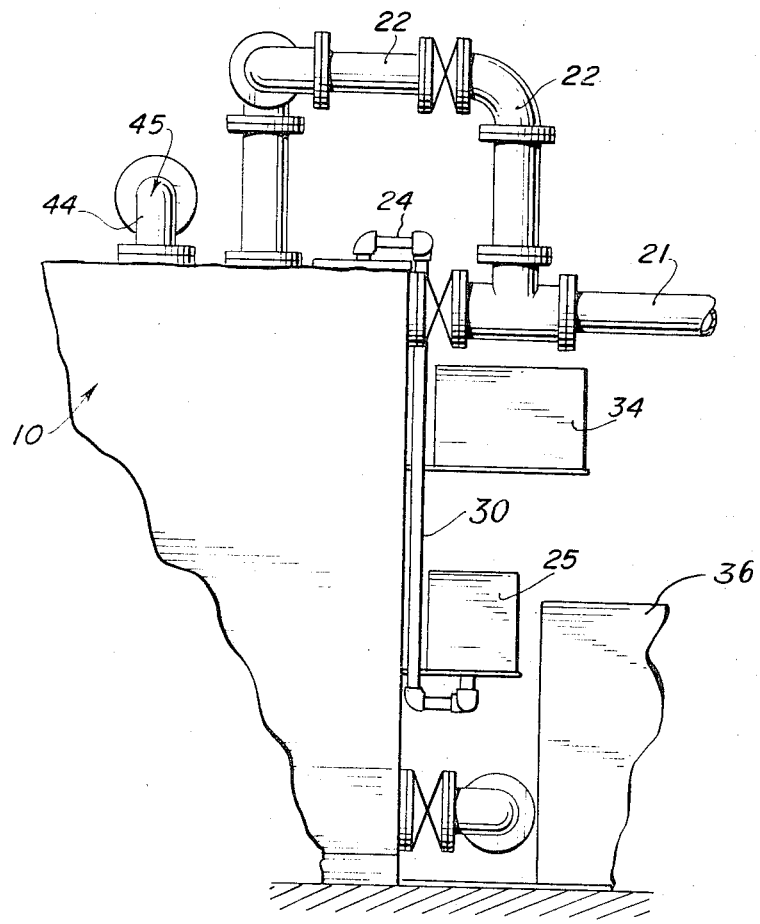
FIGURE 5 is a fragmentary schematic side elevational view along the line 5—5 of FIGURE 1.

In the drawings, the numeral 10 indicates a tank of suitable material of construction such as steel which is of a size to be positioned in the hold of a marine vessel. Tank 10 is closed at the bottom, sides and by a top cover 11 which dampens any development of waves or other agitating liquid motion imparted to the tank contents, for example, by rolling or pitching of a vessel housing the treatment unit. Tank 10 is provided with partition 12 which separates an aeration compartment 13 from a settling compartment 14 and a re-aeration compartment 15, a partition 16 which separates settling compartment 14 from re-aeration compartment 15, a partition 17 which separates storage compartment 18 from settling compartment 14 and re-aeration compartment 15. Storage compartment 18 is adapted with a baffle 19 which segregates a portion of storage zone 18 into a mixing area 20.

Aeration compartment 13 is provided with a sewage feed which may or may not flow on a metered basis. This feed enters through an inlet conduit 21 which communicates with a by-pass line 22. Air is introduced into the contents of the aeration compartment 13 by suitable gas dispersing means 23 such as a container positioned on the floor of said compartment which is open at the top and has, for example, the opening of an air pipe positioned adjacent the bottom of the container. Air is supplied to this disperser through pipe 24 from a source such as a blower 25.

Partition 12 is provided with a port 26 for flow of liquid from the aeration compartment 13 to the settling compartment 14, preferably baffled so as to exclude air from the liquid being transferred. Vertical partition 16 is adapted at its lower end with an inclined portion 27 angled from the vertical in the direction of the re-aeration compartment 15 to form a transverse slot 28 between said inclined portion 27 and the bottom of the tank.

Air is introduced into sludge re-aeration compartment 15 by suitable gas dispersing means 29 such as a precision tube disperser or a disperser of the type described previously. Air is supplied to the dispersing means 29 through a pipe 30 from blower 25 which blower may or may not provide air under pressure for delivery to the dispersing means 23 in the aeration compartment 13 through pipe 24 acting as a branch of pipe 30. Sludge is withdrawn from compartment 15 by suitable pumping means such as an airlift operating within pipe 32. Such an airlift may be supplied air by means of a small branch pipe 31 emanating from pipe 30. Air lift pipe 32 communicates generally with inlet conduit 21 so that a mixed liquid, i.e., a mixture of raw sewage and recycled sludge may be delivered to the aeration compartment 13 but may have its outlet positioned to communicate with any portion of aeration compartment 13.

Effluent is removed from the top of settling compartment 14 through conduit 33 whose inlet may or may not be equipped with strainer means. Conduit 33 is adapted with suitable pumping means 34 adapted for a constant or metered rate of discharge at the average design flow rate to optimize settling conditions, in the final tank 14. The discharge is moved through pipe 35 into mixing area 20 of storage compartment 18. Hypochlorate solution is delivered to mixing area 20 from tank 36 through pipe 37, pump 38 and pipe 39.

Inasmuch as tank 10 is closed by a cover 11 compartments 13, 14, 15 and 18 are adapted with vents 40, 41, 42 and 43, respectively. Air vents 40, 42 and 43 are connected to air vent line 44 by pipe sections 45, 46 and 47, respectively. Air vent line 44 communicates through conduit 48 to an exhaust port not shown. Venting of the tank is completed by pipe 50 which communicates with settling compartment 14 and with storage compartment 18. Pipe 50 by the elevation of its apex above the liquid level in said compartments also serves as an emergency overflow line. This elevation may be adapted for a predetermined level or head of liquid in the aeration tank or to be operative in the event of flooding of the aeration tank.

Liquor is discharged overboard from holding compartment 18 through conduit 51, pump 52 and conduit 53, or their counterparts 51a, 52a and 53a. Conduit 51 communicates for pumping down purposes through conduit 54 with aeration compartment 13. Conduits 53 and 53a may or may not discharge through a common header. Discharge overboard may be controlled manually or by means of automatic level controller.

When sewage is treated in accordance with this invention, effluent separated in the final tank and passed through a holding tank which provides a chlorine contact detention time of about half an hour is produced having less than 150 mg. per liter of suspended solids, less than 50 mg. per liter of BOD and a coliform count of less than 1000 mpn per 100 ml.

The above detailed description of this invention has been given by way of illustration without any intention that the invention be limited to the exact conditions set forth. No unnecessary limitations should be understood therefrom as modifications will be obvious to those skilled in the art.

I claim:

1. Apparatus for the treatment of sewage comprising a tank closed at the bottom, sides and top, said tank being compartmentalized by partitions to segregate an aeration compartment, a settling compartment, a re-aeration compartment and a storage compartment for treated liquor, said settling compartment being contiguous to said aeration compartment and said re-aeration compartment being contiguous to said settling compartment, said partition between said aeration compartment and settling compartment having an aperture below the normal liquid level maintained in said compartments, said partition between said settling compartment and said re-aeration compartment having an opening therein adjacent the bottom of said tank, means through which sewage is introduced into said aeration compartment, means for introducing an oxygen-bearing gaseous medium into the contents of said aeration compartment, means for introducing an oxygen-bearing gaseous medium into the contents of said re-aeration compartment, means for transferring aerated contents of said re-aeration compartment to said aeration compartment, means for transferring effluent from said settling compartment to said storage compartment, and means for discharging liquid content of said storage compartment.

2. Apparatus for the treatment of sewage comprising a tank closed at the bottom, sides and top, said tank being compartmentalized by partitions to segregate an aeration compartment, a settling compartment, a re-aeration compartment and a storage compartment for treated liquor, said settling compartment being contiguous to said aeration compartment and said re-aeration compartment being contiguous to said settling compartment, said partion between said aeration compartment and settling compartment having a baffled aperture below the normal liquid level maintained in said compartments, said partition between said settling compartment and said re-aeration compartment having an opening therein adjacent the bottom of said tank, means through which sewage is introduced into said aeration compartment, means for introducing air into the contents of said aeration compartment, means for introducing air into the contents of said re-aeration compartment, means for moving aerated contents of said re-aeration tank to said aeration compartment, means for moving effluent from said settling compartment to said storage compartment, a baffle adjacent the outlet from said means for moving effluent forming a mixing area in said storage compartment, piping means for introduction of disinfectant solution into said mixing area and means for discharging liquid content of said storage compartment.

3. Apparatus installable on marine vessels for the treatment of sewage comprising a tank closed at the bottom, sides and top, said tank being compartmentalized by partitions to segregate an aeration compartment, a settling compartment, a re-aeration compartment and a storage compartment for treated liquor, said settling compartment being contiguous to said aeration compartment and said re-aeration compartment being contiguous to said settling compartment, said partition between said aeration compartment and settling compartment having an aperture below the normal liquid level maintained in said compartments, said partition between said settling compartment and said re-aeration compartment having an opening therein adjacent the bottom of said tank, means through which sewage is introduced into said aeration compartment, means for introducing air into the contents of said aeration compartment, means for introducing air into the contents of said re-aeration compartment, means for continuously moving predetermined quantities of re-aeration tank contents to said aeration compartment, means for continuously moving predetermined quantities of effluent from said settling compartment to said storage compartment, a baffle adjacent the outlet from said means for moving effluent forming a mixing area in said storage compartment, piping means for introduction of disinfectant solution into said mixing area and means for discharging liquid content of said storage compartment overboard.

4. Apparatus installable on marine vessels for the treatment of sewage comprising a tank closed at the bottom, sides and top, said tank being compartmentalized by partitions to segregate an aeration compartment, a settling compartment, a re-aeration compartment and a storage compartment for treated liquor, said settling compartment being contiguous to said aeration compartment and said re-aeration compartment being contiguous to said settling compartment, said partition between said aeration compartment and settling compartment having a baffled aperture below the normal liquid level maintained in said compartments, said partition between said settling compartment and said re-aeration compartment having the lower portion thereof inclined downwardly in the direction of said re-aeration compartment to form a liquid transfer slot between said inclined portion and the bottom of said tank, means through which sewage is introduced into said aeration compartment, means for introducing air into the contents of said aeration compartment, means for introducing air into the contents of said re-aeration compartment, means for continuously moving predetermined quantities of re-aeration tank contents to said aeration compartment, means for continuously moving predetermined quantities of effluent from said settling compartment to said storage compartment, a baffle adjacent the outlet from said means for moving effluent forming a mixing area in said storage compartment, piping means for introduction of disinfectant solution into said mixing area and means for discharging liquid content of said storage compartment overboard.

5. Apparatus installable on marine vessels for the treatment of sewage comprising a tank closed at the bottom, sides and top, said tank being compartmentalized by partitions to segregate an aeration compartment, a settling compartment, a re-aeration compartment and a storage compartment for treated liquor, said settling compartment being contiguous to said aeration compartment and said re-aeration compartment being contiguous to said settling compartment, said partition between said aeration compartment and settling compartment having a baffled aperture below the normal liquid level maintained in said compartments, said partition between said settling compartment and said re-aeration compartment having the lower portion thereof inclined downwardly in the direction of said re-aeration compartment to form a liquid transfer slot between said inclined portion and the bottom of said tank, means through which sewage is introduced into said aeration compartment, means for introducing air into the contents of said aeration compartment, means for introducing air into the contents of said re-aeration compartment, means for continuously moving predetermined quantities of re-aeration tank contents to said aeration compartment, means for discharging metered quantities of effluent from said settling compartment to said storage compartment, a baffle adjacent the outlet from said means for moving effluent forming a mixing area in said storage compartment, piping means for introduction of disinfectant solution into said mixing area and means for discharging liquid content of said storage compartment overboard.

6. Apparatus for the treatment of sewage comprising a tank closed at the bottom, sides and top, said tank being compartmentalized by partitions to segregate an aeration compartment, a settling compartment, a re-aeration compartment and a storage compartment for treated liquor, said settling compartment being contiguous to said aeration compartment and said re-aeration compartment being contiguous to said settling compartment, said partition between said aeration compartment and settling compartment having a baffled aperture below the normal liquid level maintained in said compartments, said partition between said settling compartment and said re-aeration compartment having an opening therein adjacent the bottom of said tank, means through which sewage is introduced into said aeration compartment, means for introducing air into the contents of said aeration compartment, means for introducing air into the contents of said re-aeration compartment, means for transferring aerated contents of said re-aeration compartment to said aeration compartment, a conduit communicating with said settling compartment and said storage compartment, a strainer positioned at the inlet to said conduit, a pump associated with said conduit adapted to maintain a constant flow of liquid therethrough, a baffle adjacent the outlet from said conduit segregating a mixing area within said storage compartment, piping means for introduction of disinfectant solution into said mixing area and means for discharging liquor from said storage compartment.

7. Apparatus installable on marine vessels for the treatment of sewage comprising a tank closed at the bottom, sides and top, said tank being compartmentalized by partitions to segregate an aeration compartment, a settling compartment, a re-aeration compartment and a storage compartment for treated liquor, said settling compartment being contiguous to said aeration compartment and said re-aeration compartment being contiguous to said settling compartment, said partition between said aeration compartment and settling compartment having a baffled aperture below the normal liquid level maintained in said compartments, said partition between said settling compartment and said re-aeration compartment having the lower portion thereof inclined downwardly in the direction of said re-aeration compartment to form a liquid transfer slot between said inclined portion and the bottom of said tank, means through which sewage is introduced into said aeration compartment, means for introducing air into the contents of said aeration compartment, means for introducing air into the contents of said re-aeration compartment, means for continuously moving predetermined quantities of re-aeration tank contents to said aeration compartment, means for discharging metered quantities of effluent from said settling compartment to said storage compartment, conduit means in communication with said settling compartment and said storage compartment establishing by its elevation above the liquid level in said compartments an automatic liquid overflow responsive to liquid level in said aeration compartment, a baffle adjacent the outlet from said means for moving effluent forming a mixing area in said storage compartment, piping means for introduction of disinfectant solution into said mixing area and means for discharging liquid content of said storage compartment overboard.

8. The method of treating sewage which comprises establishing aeration, settling, sludge re-aeration and effluent storage zones, said aeration and settling zones being contiguous and communicating at a point below the normal liquid level of said zones, said settling and sludge re-aeration zones being contiguous and communicating in the lower portions of said zones, establishing a mixture of sewage and sludge in said aeration zone, passing air into said mixture in said aeration zone in quantities to satisfy a major proportion of the BOD, flowing aerated mixture from said aeration zone to said settling zone in liquid level maintaining response to liquid level differential between said zones, flowing settled sludge from said settling zone to said re-aeration zone as a consequence of liquid level maintaining response to discharge of sludge from said re-aeration zone, passing air into said sludge in said re-aeration zone, discharging aerated sludge from said re-aeration zone to said aeration zone for introduction of sludge in the establishing of said mixture in said aeration zone, discharging clarified liquor from said settling zone to said effluent storage zone and thereafter discharging stored liquor to a receiving body.

9. The method of treating sewage which comprises establishing contiguous aeration, settling and sludge re-aeration zones, and an effluent storage zone, said aeration and settling zone communicating at a point below the normal liquid level of said zones, said settling and sludge re-aeration zones communicating in the lower portions of said zones, establishing a mixture of sewage and sludge in said aeration zone, passing air into said mixture in said aeration zone in quantities to satisfy a major proportion of the BOD, flowing aerated mixture from said aeration zone to said settling zone in liquid level maintaining response to liquid level differential between tank zones under conditions to exclude passage of air with the transferred liquid, flowing settled sludge from said settling zone to said re-aeration zone as a consequence of liquid level maintaining response to discharge of sludge from said re-aeration zone, passing air into said sludge in said re-aeration zone, discharging aerated sludge from said re-aeration zone to said aeration zone for introduction of sludge in the establishing of said mixture in said aeration zone, discharging clarified liquor at a constant rate from said settling zone to said effluent storage zone and discharging stored liquor to a receiving body.

10. The method of treating sewage which comprises establishing contiguous aeration, settling and sludge re-aeration zones, and an effluent storage zone, said aeration and settling zone communicating at a point below the normal liquid level of said zones, said settling and sludge-reaeration zones communicating in the lower portions of said zones, establishing a mixture of sewage and sludge in said aeration zone, passing air into said mixture in said aeration zone in quantities to satisfy a major proportion of the BOD, flowing aerated mixture from said aeration zone to said settling zone in liquid level maintaining response to liquid level differential between tank zones, flowing settled sludge from said settling zone to said re-aeration zone as a consequence of liquid level maintaining response to discharge of sludge from said reaeration zone, passing air into said sludge in said re-aeration zone, discharging aerated sludge from said re-aeration zone to said aeration zone for introduction of sludge in the establishing of said mixture in said aeration zone, discharging clarified liquor intermittently from said settling zone to said effluent storage zone and discharging stored liquor to a receiving body.

11. The method of treating sewage which comprises establishing contiguous aeration, settling and sludge re-aeration zones and an effluent storage zone, said aeration zone operating with excess volume of up to 100% over average rated capacity of said settling, re-aeration and holding zones, said aeration and settling zone comunicating at a point below the normal liquid level of said zones, said settling and sludge re-aeration zones communicating in the lower portions of said zones, the submerged communication between aeration zone, the settling zone and the reaeration zone providing for operation of said settling zone and said re-aeration zone in flooded condition, establishing a mixture of sewage and sludge in said aeration zone, passing air into said mixture in said aeration zone in quantities to satisfy a major proportion of the BOD, flowing aerated mixture from said aeration zone to said settling zone in liquid level maintaining response to liquid level differential between tank zones, flowing settled sludge from said settling zone to said re-aeration zone as a consequence of liquid level maintaining response to discharge of sludge from said re-aeration zone, passing air into said sludge in said re-aeration zone, discharging aerated sludge from said re-aeration zone to said aeration zone for introduction of sludge in the establishing of said mixture in said aeration zone, discharging clarified liquor from said settling zone to effluent storage and discharging stored liquor to a receiving body.

12. The method of treating sewage in a marine vessel application which comprises establishing a contiguous aeration, settling and sludge re-aeration zones and an effluent storage zone, said aeration and settling zone communicating at a point below the normal liquid level of said zones, said settling and sludge re-aeration zones communicating in the lower portions of said zones, establishing a mixture of sewage and sludge in said aeration zone, passing air into said mixture in said aeration zone in quantities to satisfy a major proportion of the BOD, flowing aerated mixture from said aeration zone to said settling zone in liquid level maintaining response to discharge of material from said settling zone, flowing settled sludge from said settling zone to said re-aeration zone as a consequence of liquid level maintaining response to liquid level differential between tank zones, passing air into said sludge in said re-aeration zone, discharging aerated sludge in quantities between about 25% and about 200% by volume of the incoming sewage from said re-aeration zone to said aeration zone for introduction of sludge in the establishing of said mixture in said aeration zone, discharging clarified liquor from said settling zone to said effluent storage zone and discharging stored liquor to a marine body.

13. The method of treating sewage in a marine vessel application which comprises establishing contiguous aeration, settling and sludge re-aeration zones, and an effluent storage zone, said aeration and settling zone communicating for flow of liquid medium at a point below the normal liquid level of said zones, said settling and sludge re-aeration zones communicating in the lower portions of said zones, establishing an aqueous mixture of sewage and sludge in said aeration zone, passing air in dispersed bubble form into said mixture in said aeration zone in quantities to satisfy a major proportion of the BOD, flowing aerated mixture continuously in predetermined quantities from said aeration zone to said settling zone in liquid level maintaining response to discharge of material from said settling zone and during flow from said aeration zone to said settling zone effecting separation of gas bubbles from said aqueous mixture, flowing settled sludge continuously in predetermined quantities from said settling zone to said re-aeration zone as a consequence of liquid level maintaining response to discharge of sludge from said re-aeration zone, passing air into said sludge in said re-aeration zone, discharging aerated sludge from said re-aeration zone to said aeration zone for introduction of sludge in the establishing of said mixture in said aeration zone, discharging clarified liquor from said settling zone to said effluent storage zone and discharging stored liquor to a marine body.

14. The method of treating sewage in a marine vessel application which comprises establishing contiguous aeration, settling and sludge re-aeration zones and an effluent storage re-aeration zone communicating in the lower portions of said zones, establishing a mixture of sewage and sludge in said aeration zone, passing air into said mixture in said aeration zone in quantities to satisfy a major proportion of the BOD, flowing aerated mixture from said aeration zone to said settling zone in liquid level maintaining response to discharge of material from said settling zone, flowing settled sludge from said zone to said re-aeration zone as a consequence of liquid level maintaining response to discharge of sludge from said re-aeration zone, passing air into said sludge in said re-aeration zone, discharging clarified effluent from said settling zone to said effluent storage zone, mixing said clarified effluent with disinfecting medium and discharging the disinfected clarified effluent to a marine body.

15. The method of treating sewage which comprises establishing contiguous aeration, settling and sludge re-aeration zones and an effluent storage zone said aeration zone having an excess volume of up to 100% over average rated capacity of said settling, re-aeration and holding zones, said aeration and settling zone communicating at a point below the normal liquid level of said zones, said settling and sludge re-aeration zones communicating in the lower portions of said zones, establishing a mixture of sewage and sludge in said aeration zone, flowing sewage in metered quantities into said aeration zone to mix with the mixture therein, passing air into said mixture in said aeration zone in quantities to satisfy a major proportion of the BOD, flowing aerated mixture from said aeration zone to said settling zone in liquid level maintaining response to liquid level differential between tank zones, flowing settled sludge from said settling zone to said re-aeration zone as a consequence of liquid level maintaining response to discharge of sludge from said re-aeration zone, passing air into said sludge in said re-aeration zone, discharging aerated sludge from said re-aeration zone to said aeration zone for introduction of sludge in the establishing of said mixture in said aeration zone, discharging clarified liquor from said settling zone to said effluent storage zone and discharging stored liquor to a receiving body.

16. The method of treating sewage which comprises establishing contiguous aeration, settling and sludge re-aeration zones and an effluent storage zone, said aeration zone having an excess volume of between 10% to 50% over average rated capacity of said settling, re-aeration and holding zones, said aeration and settling zone communicating at a point below the normal liquid level of said zones, said settling and sludge re-aeration zones communicating in the lower portions of said zones, establishing a mixture of sewage and sludge in said aeration zone, passing air into said mixture in said aeration zone in quantities to satisfy a major proportion of the BOD, flowing aerated mixture from said aeration zone to said settling zone in liquid level maintaining response to liquid level differential between tank zones, flowing settled sludge from said settling zone to said re-aeration zone as a consequence of liquid level maintaining response to discharge of sludge from said re-aeration zone, passing air into said sludge in said re-aeration zone, discharging aerated sludge from said re-aeration zone to said aeration zone for introduction of sludge in the establishing of said mixture in said aeration zone, flowing effluent from said settling zone, removing solid material from said effluent from said settling zone, discharging the resultant effluent to said effluent storage zone, mixing disinfectant solution with said zones said aeration and settling zone communicating at a point below the nomal liquid level of said zone, said settling and sludge effluent in the effluent storage zone and discharging disinfected liquor to a receiving body.

17. The method of treating sewage in a marine vessel application which comprises establishing contiguous aeration, settling and sludge re-aeration zones and an effluent storage zone, said aeration and settling zone communicating at a point below the normal liquid level of said zones with a passage establishing downwardly directed flow of liquid whereby liquid and air bubbles separate leaving the air bubbles in said aeration zone, said settling and sludge re-aeration zone communicating in the lower portions of said zones, establishing an aqueous mixture of sewage and sludge in said aeration zone in excess of the quantity established by average influent flow, passing air in dispersed bubble form into said mixture in said aeration zone in quantities to satisfy a major proportion of the BOD, flowing aerated mixture from said aeration zone to said settling zone in liquid level maintaining response to discharge of material from said settling zone, flowing settled sludge from said zone to said re-aeration zone as a consequence of liquid level maintainiing response to discharge of sludge from said re-aeration zone, passing air into said sludge in said re-aeration zone, discharging clarified effluent in metered quantities from said settling zone to said effluent storage zone, discharging clarified effluent in excess of the metered quantities by overflow from said settling zone to said effluent storage zone in response to head of liquid in said aeration zone exceeding the required head for overflow between said compartments, and discharging stored liquor from said effluent storage to a marine body.

References Cited

UNITED STATES PATENTS 2,901,114   8/1959   Smith et al. _____ 210—15 X

MORRIS O. WOLK, *Primary Examiner.*

M. E. ROGERS, *Examiner.*